W. I. PENNOCK.
APPARATUS FOR COLLECTING ATMOSPHERIC ELECTRICITY.
APPLICATION FILED JUNE 26, 1907.
911,260.
Patented Feb. 2, 1909.
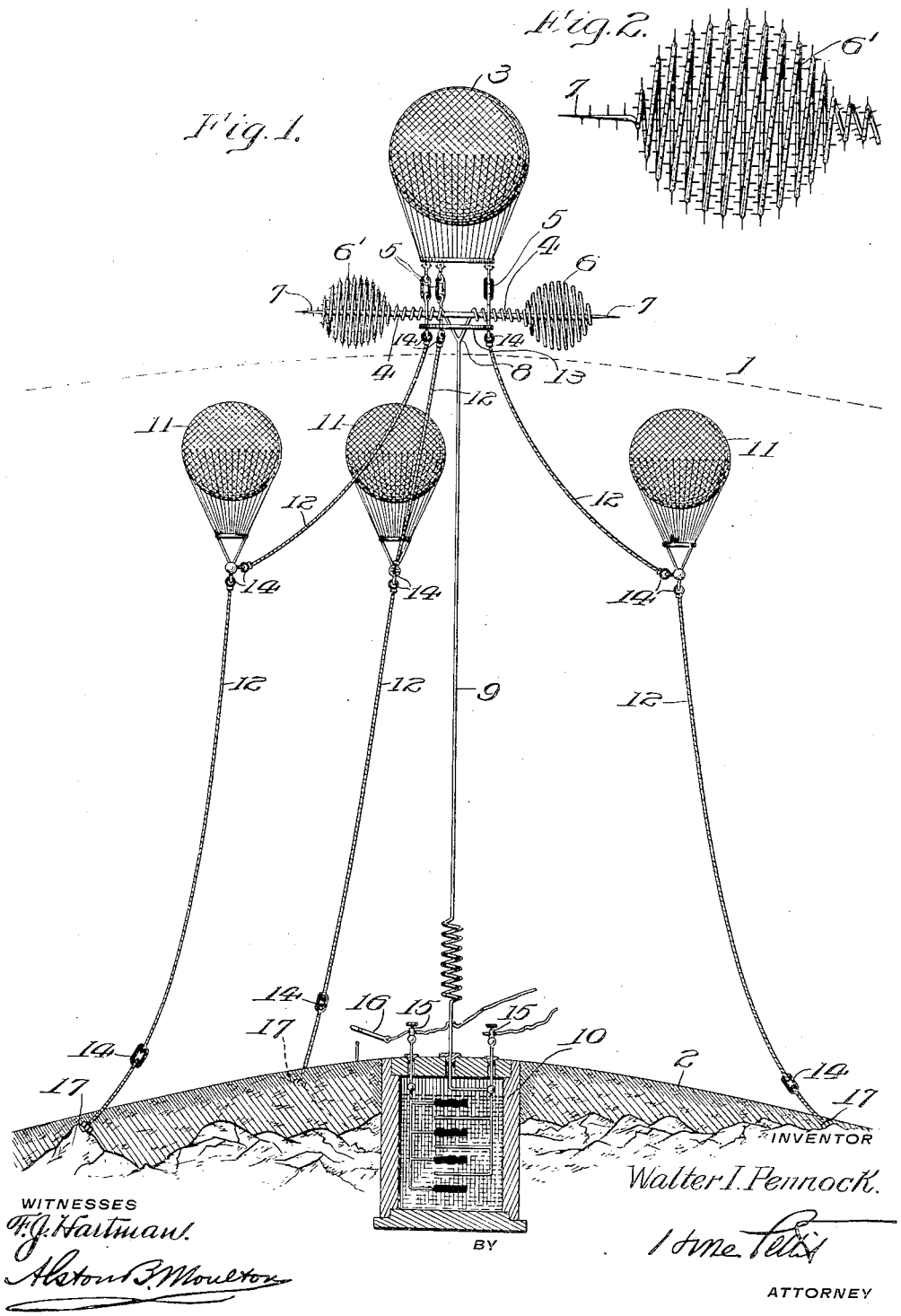
WITNESSES
F. J. Hartman
Alston P. Moulton
INVENTOR
Walter I. Pennock.
BY
ATTORNEY

UNITED STATES PATENT OFFICE.

WALTER I. PENNOCK, OF PHILADELPHIA, PENNSYLVANIA.

APPARATUS FOR COLLECTING ATMOSPHERIC ELECTRICITY.

No. 911,260.  Specification of Letters Patent.  Patented Feb. 2, 1909.

Application filed June 26, 1907. Serial No. 380,907.

*To all whom it may concern:*

Be it known that I, WALTER I. PENNOCK, a citizen of the United States, residing at Philadelphia, in the county of Philadelphia and State of Pennsylvania, have invented certain new and useful Improvements in Apparatus for Collecting Atmospheric Electricity, of which the following is a specification.

My invention relates to a method of collecting electricity from a strata laden with electricity at high altitudes in the atmosphere, through the medium of a wire cable suspended from one or more balloons and in conveying this electricity to the earth's surface.

The object of my invention is to provide a conveyance of the electro motive force to be found in the upper strata of the atmosphere to the earth's surface; where it may be utilized for commercial and other purposes.

A further object of my invention is to provide a device or mechanism by which a suitable collector for the electrical energy in the upper strata of the earth's atmosphere may be elevated in the said strata and by which the said electric energy may be transmitted to and collected at the earth's surface, from which point it may be conducted to any place where it is desired to use the same.

A further object of my invention is to support and anchor said device in any desired position.

A further object of my invention is to provide an improved form of collector through which the energy of the said upper strata of the earth's atmosphere may be collected and transmitted for various purposes to the earth's surface.

Other objects of my invention will appear in the specification and claims below.

For a further full, clear and complete disclosure of my invention, reference may be had to the following description and accompanying drawings, in which like reference characters refer to corresponding parts.

Figure 1 is an elevational view of one form or embodiment of my invention and Fig. 2 is a detailed view of one form of my improved collector.

The passage of the electrical current to the earth under ordinary conditions is prevented by an obstruction afforded by the dense lower strata of the atmosphere, which is a bad conductor of electricity, as shown by the electrodes of an ordinary static machine. When the electrodes are placed close together, the atmosphere is seen to carry the current across from one electrode to another, but if placed far apart the current is obstructed by the intervening air. The dense lower strata of the atmosphere affords one of the best non-conductors of electricity, as shown in the conduction of the electric current by telegraph, or trolley wires on the earth's surface, where only a small quantity of the electric current escapes through the atmosphere; while rarefied atmosphere affords a good conducting media, as shown by the vacuum tube. The upper strata of the atmosphere being rare in proportion to the altitude, and being a good conductor of electricity while the lower strata of the atmosphere being dense and affording a non-conducting media for the electric current, thus causes an obstruction to the electric current, or power in its passage to the earth's surface from the electric strata of the atmosphere under ordinary conditions. When, however, the cumulus clouds of a thunder storm pass over the surface of the earth, these clouds being of very great height, the moisture in said clouds forms a better conductor of electricity than does the dry air, with the result that the electricity in the upper strata of the atmosphere breaks through the said cloud as a streak of lightning and in that form reaches even to the earth's surface, while the thin or shallow strata of clouds, observed in the so-called "settled rain" storm, do not extend upward to a sufficient height to form a conducting medium for the electricity from the electric strata to the earth's surface. For this reason there is usually no lightning during the said latter variety of rain storm.

By means of my invention, I have provided a mechanism for collecting the electrical energy or power created by nature and stored in the upper strata of rarefied air of the earth's atmosphere and have provided a conductor for said electric energy to the earth's surface.

Referring now to the drawings 1 indicates what may be called the lower limits or boundaries of the strata of electric energy above the surface 2 of the earth.

3 indicates a balloon which is elevated to a high altitude until it enters the said stratum. The said balloon 3 carries a bar 4 of wood or any other suitable non-conducting material suspended by insulating links 5 or any other suitable form of insulation from the balloon 3. Upon either end of the said bar 4 I mount collectors, one form of which I have illustrated as spheres of coiled wire 6—6' the outer ends 7 of which terminate in sharp points. The inner turns of the said spheres 6 and 6' are wrapped around the wooden bar 4 and united as at 8 to a conductor of electric energy, preferably a large copper wire 9. This wire or conductor 9 extends to the earth's surface and may have its end suitably attached to an electric accumulator or other piece of electrical apparatus. I have illustrated one form of my invention in which the conductor 9 is connected to one pole of a storage battery 10 on the earth's surface.

The spiral spheres 6, 6' are preferably provided with a polished metallic surface to form a good conductor of electricity and the material of said spheres should also be of such a character that it will not rust or corrode or tarnish. A polished copper wire or a copper wire plated with platinum or gold or a solid platinum or gold wire may be used for this purpose, inasmuch as these materials are least affected by moisture and the atmosphere. The said spheres or collectors may be made of smooth wire as shown in the sphere designated by the numeral 6 or of barbed wire, as is shown at 6' and illustrated on a larger scale in Fig. 2 of the drawings. The latter form is preferable inasmuch as it provides a large number of points through which the electricity may flow to the wire from the surrounding air in the said upper strata of the earth's atmosphere.

In order that the supporting balloon 3 may be held in a relatively fixed position, it should be suitably anchored to the earth's surface. Inasmuch as the balloon 3 must be elevated to a very high position, the weight of the anchoring cables forms an important consideration, and if desired or necessary one or more supplemental balloons 11, 11, 11 may be attached to each of the anchoring cables 12, 12, 12 as illustrated in Fig. 1, to relieve the balloon 3 of such weight as would prevent it from ascending into the said electrical strata. In order that the electricity from the said upper strata of the earth's atmosphere may not be conducted down the anchoring cables 12, 12, 12, I attach them to the supporting balloon 3 and to the supplemental balloons 11 and to the earth's surface through suitable insulating devices 14.

In the form of my invention illustrated in Fig. 1, below the bar 4, I suspend a ring 13 of any suitable material from the balloon 3, and attach the anchoring cables 12 thereto by means of insulating rings 14, 14, 14. I may also provide additional insulating rings 14 between that portion of the anchoring cables 12 between the balloon 3 and the supplemental balloons 11, and also between that part of the cable 12 between the supplemental balloons 12 and the earth's surface. I may also provide, near the earth's surface and at the lower end of the anchoring cables 12, similar insulating links 14. While I have described links as forming a convenient form of insulating device for the purposes above set forth, I do not wish to be construed as being limited to the same, inasmuch as any suitable non-conducting connection may be used in place of the links 14.

The terminals 15, 15 of the storage battery 10 may be connected to any piece of electric apparatus which it is desired to run or operate and if desirable one of the poles of the battery is adapted to be connected by the switch 16 with the earth's surface. The lower ends of the anchoring cables 12 are securely anchored to the earth's surface as at 17.

With the apparatus arranged and connected in the manner illustrated in Fig. 1, the electric energy in the high strata of the earth's atmosphere passes to and through the conductive spiral spheres 6 or 6' to the conductor 9 and is suitably stored or used at the earth's surface, while the balloons 11 support a part of the weight of the anchoring cables 12, and permit the balloon 3 to ascend as high as is possible, or necessary for it to enter the said electrical strata of the earth's atmosphere. By arranging the anchorage 17 of the cables 12 symmetrically or in any other position than in a straight line, the balloon 3 may be held in a substantially fixed position with relation to the earth.

While I have illustrated in the drawings and have described in the specification a form of apparatus in which my invention may be carried out, it is obvious that the drawings are more or less diagrammatic drawings, that is to say, that the proportions of the various parts are not necessarily those which would operate to the best advantage, inasmuch as certain portions have been shown as greatly enlarged in the drawings for the sake of clearness, and that it is likely that more than one supplemental balloon would be required for each cable in order to support the weight of the same, and to relieve the supporting balloon 3 of such weight, as would prevent it from ascending into the high electrical strata of the earth's atmosphere, but such changes in form, proportion and arrangement I regard as being fully within the aim and scope of my invention, so long as such forms or modifications fall within the scope of the appended claims. It is also to be understood that the storage battery or accumulator which I have shown as being connected to my collector, is only a type of apparatus which can be operated by the current collected by the spheres 6, 6' and transmitted to the earth through the wire 9, and when I use the word "accumulator", I mean any piece of useful apparatus which is operated by the current transmitted thereto through the wire or conductor 9.

Having thus described my invention, what I claim and desire to protect by Letters Patent of the United States is:

1. The combination with an electrical collector comprising a bar of non-conducting material, and an open spherical conductor carried by said bar, of means to support said collector in the high electrical strata of the earth's atmosphere.

2. The combination with a balloon, of an electrical collector supported thereby and insulated therefrom, comprising a bar of non-conducting material, and a conductor wound spirally around said bar.

3. The combination with an electrical collector comprising a non-conducting bar, and a conductive wire wound thereon to form an open substantially spherical body, and means to support said collector in the high electrical strata of the earth's atmosphere.

4. The combination with a balloon, of an electrical collector carried thereby and comprising a non-conducting bar, and a polished wire wound spirally thereon to form an open substantially spherical body.

5. The combination with an electrical collector comprising a non-conducting bar, and a wire wound spirally thereon to form an open substantially spherical body, said wire being provided with pointed conducting projections, and means to support said collector in the high electrical strata of the earth's atmosphere.

6. The combination with a balloon, of an electrical collector carried thereby comprising a non-conducting bar, and a conducting wire wound spirally thereon to form open substantially spherical bodies upon the opposite ends thereof.

7. The combination with a balloon, of an electrical collector carried thereby comprising a non-conducting bar, a conducting wire wound spirally thereon to form open substantially spherical bodies upon the opposite ends thereof, an electrical accumulator, and an electrical connection between the said collector and said accumulator.

8. The combination with a balloon, and means to anchor said balloon, of an electrical collector supported by said balloon and insulated therefrom, an electrical accumulator, and a conductor connecting said collector and said accumulator.

9. The combination of an electrical collector, means to support said collector at a high elevation from the earth's surface and within the electrical strata of the earth's atmosphere, an electrical accumulator at the earth's surface, an electrical connection between said collector and said accumulator, and means to insulate said supporting means from said collector and from the earth.

In testimony whereof, I have hereunto set my hand this 25th day of June, 1907.

WALTER I. PENNOCK.

Witnesses:
HUGH F. QUINN,
WM. G. GLENN.